US010697831B2

(12) United States Patent
Meng et al.

(10) Patent No.: US 10,697,831 B2
(45) Date of Patent: Jun. 30, 2020

(54) LIGHT MODULATING DEVICE AND SPECTRAL DETECTION SYSTEM

(71) Applicant: BOE TECHNOLOGY GROUP CO., LTD., Beijing (CN)

(72) Inventors: Xiandong Meng, Beijing (CN); Xianqin Meng, Beijing (CN); Wei Wang, Beijing (CN); Jifeng Tan, Beijing (CN); Fangzhou Wang, Beijing (CN); Qiuyu Ling, Beijing (CN); Xiaochuan Chen, Beijing (CN); Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/448,621

(22) Filed: Jun. 21, 2019

(65) Prior Publication Data

US 2020/0088578 A1 Mar. 19, 2020

(51) Int. Cl.
*G01J 3/18* (2006.01)
*G01J 3/02* (2006.01)
*G02B 27/10* (2006.01)

(52) U.S. Cl.
CPC ........... *G01J 3/1804* (2013.01); *G01J 3/0208* (2013.01); *G02B 27/1013* (2013.01); *G02B 27/1086* (2013.01); *G01J 2003/1861* (2013.01)

(58) Field of Classification Search
CPC ................ G01J 3/1804; G01J 3/0208; G01J 2003/1861; G02B 27/1086; G02B 27/1013
See application file for complete search history.

(56) References Cited

U.S. PATENT DOCUMENTS

| 5,161,057 A * | 11/1992 | Johnson | G02B 3/08 359/566 |
| 5,710,429 A * | 1/1998 | Alfano | G01N 21/49 250/330 |
| 6,512,732 B1 * | 1/2003 | Bierhoff | G11B 7/0908 369/109.02 |
| 2005/0210996 A1* | 9/2005 | Quinn | G01N 21/05 73/861 |
| 2007/0279745 A1* | 12/2007 | Klemann | B29D 11/0074 359/566 |
| 2008/0084517 A1* | 4/2008 | Itou | G02F 1/133514 349/62 |

(Continued)

*Primary Examiner* — Hina F Ayub
(74) *Attorney, Agent, or Firm* — Nath, Goldberg & Meyer; Joshua B. Goldberg

(57) ABSTRACT

A light modulating device includes a dispersion assembly and a lens assembly, the dispersion assembly is configured to disperse light emitting from a light source into dispersed light which at least includes collimated monochromatic light and non-collimated monochromatic light; the lens assembly includes: at least a first lens component; at least a second lens component disposed in a one-to-one correspondence with the first lens component; a first absorbing layer disposed between the first lens component and the second lens component, the first absorbing layer has an opening, a focus point of the first lens component towards the first absorbing layer coincides with a focus point of the second lens component towards the first absorbing layer, the opening is disposed at the coincident focus point of the first lens component and the second lens component.

19 Claims, 2 Drawing Sheets

(56) References Cited

U.S. PATENT DOCUMENTS

2009/0011368 A1* 1/2009 Ichihara .............. G02B 5/1838
430/319
2009/0141022 A1* 6/2009 Kimpe .................... H04N 9/07
345/419
2010/0141951 A1* 6/2010 Ali .................... B01L 3/502715
356/436

* cited by examiner

LIGHT MODULATING DEVICE AND SPECTRAL DETECTION SYSTEM

CROSS-REFERENCE TO RELATED APPLICATION

The present application claims the priority to the Chinese Patent Application No. 201811074379.5 filed on Sep. 14, 2018 and entitled "Light Modulating Device and Spectral Detection System", the disclosure of which is incorporated herein in its entirely by reference.

TECHNICAL FIELD

The disclosure belongs to the field of optical technologies, and in particular, relates to a light modulating device and a spectral detection system.

BACKGROUND

A light modulating device in related art generally includes an entrance slit, a collimating part, a dispersion assembly, a focusing part, and the like. Since the light modulating device has many components independently arranged, its volume is usually too large, and an operating environment of the light modulating device is limited. It can be used in a laboratory or other spacious environment, but cannot be used in a narrow and small space. Therefore, an application scope of the light modulating device is limited.

In addition, silicon wafers or other organic materials are generally used for fabricating collimating parts, dispersion assembles, and the like for known light modulating devices. However, organic materials such as silicon wafers are relatively expensive, thereby increasing a fabricating cost of the light modulating device.

SUMMARY

According to an aspect of the present disclosure, a technical solution is provided which includes a light modulating device including a dispersion assembly and a lens assembly.

The dispersion assembly is configured to disperse light emitted from the light source into dispersed light, in which the dispersed light at least includes collimated monochromatic light and non-collimated monochromatic light; the lens assembly includes: at least one first lens component; at least one second lens component, the second lens component being in one-to-one correspondence with the first lens component; and a first absorbing layer disposed between the first lens component and the second lens component, the first absorbing layer has an opening, a focus point of the first lens component towards the first absorbing layer coincides with a focus point of the second lens component towards the first absorbing layer, the opening is disposed at the coincident focus point of the first lens component and the second lens component; the opening has a size configured to allow the collimated monochromatic light transmitted from the first lens component to irradiate to the second lens component via the openings and emit out.

In some embodiments, the dispersion assembly includes a light source and a grating, the grating is configured to disperse the light emitted from the light source into dispersed light.

In some embodiments, the grating includes a plurality of sub-gratings arranged in intervals, each sub-grating has a plurality of slits having a same length and a same spacing, light emitted from the light source and has a projection on the grating plane being vertical to the slit of a sub-grating passes through the sub-grating to obtain dispersed light, so that each sub-grating disperse a light having one wavelength into dispersed light, wherein a duty ratio of the sub-gratings is 0.5.

In some embodiments, the first lens component and the second lens component includes one lens respectively; the first absorbing layer has one opening.

In some embodiments, the first lens component and the second lens component include a plurality of lens, respectively; the first absorbing layer has a plurality of openings, and light emitted from each of the openings is monochromatic light.

In some embodiments, a shape of the opening of the first absorbing layer includes a rectangle or a circle, a side length or a diameter S of the opening is:

$$S=|f_1*\tan(\beta_{min})|+|f_1*\tan(\beta_{max})|,$$

wherein, $f_1$ is a focus length of the first lens component, $\beta_{min}$ is a maximum exit angle of the dispersed light having a minimum wavelength within a spectral dispersion accuracy range on a side of the sub-gratings, and $\beta_{max}$ is a maximum exit angle of the dispersed light having a maximum wavelength within the spectral dispersion accuracy range on the other side of the sub-gratings.

In some embodiments, the sub-gratings have different orientations so that incident light having different wavelengths is dispersed as different dispersed light.

In some embodiments, the sub-gratings and the openings of the first absorbing layer are arranged in an array, respectively.

In some embodiments, the sub-gratings are arranged radially relative to the center of the grating.

In some embodiments, the lens assembly further includes: a first substrate, the first substrate includes a first surface and a second surface disposed opposite to each other, the first lens component is disposed on the first surface, and the second lens component is disposed on the second surface.

In some embodiments, the first substrate includes a first sub-substrate and a second sub-substrate, the first lens component is disposed on a surface of the first sub-substrate distal to the second sub-substrate, and the second lens component is disposed on a surface of the second sub-substrate distal to the first sub-substrate.

In some embodiments, the first substrate is made of transparent glass; and the first lens component and the second lens component are Fourier lenses respectively.

In some embodiments, the dispersion assembly further includes: a second substrate including a third surface and a fourth surface arranged opposite to each other, the light source is disposed on the third surface, and the grating is disposed on the fourth surface.

In some embodiments, a period of the sub-grating is calculated according to the following grating equation:

$$n_1\sin\theta_1 - n_2\sin\theta_2 = \frac{m\lambda}{p},$$

wherein, $n_1$ is a refractive index in the second substrate of an incident light on the sub-grating, $n_2$ is a refractive index in the first substrate of the diffracted light on the sub-grating, $\lambda$ is a wavelength of the dispersed light dispersed by the sub-grating, $\theta_1$ is a incident angle, $\theta_2$ is a diffraction angle, m is a diffraction level, and P is a period of the sub-grating.

In some embodiments, the second substrate is made of transparent glass.

In some embodiments, a second absorbing layer is disposed in a spaced region among the sub-gratings of the grating, and is configured to absorb light having incident angles which is different from designed angle.

In some embodiments, the first absorbing layer and the second absorbing layer are black matrix layer respectively.

According to another aspect of the present disclosure, the present disclosure provides a spectral detection system, including: the above light modulating device; and the detection device, the detection device includes: microfludic device disposed on a side of the lens assembly proximal to the second lens, and configured to drive microfludic movement; a detector array disposed on a side of the microfludic device distal to the lens assembly, wherein the light emitted from the lens assembly passes the microfludic device and irradiate the detector array.

In some embodiments, further including a third substrate and a third absorbing layer, the detection array is disposed on the third substrate, the third absorbing layer is a black matrix layer disposed in a spaced region among the detector array and configured to absorb stray light, the third substrate is made of glass.

In some embodiments, the detection array includes photosensitive detectors.

DETAILED DESCRIPTION

Figure 1A:
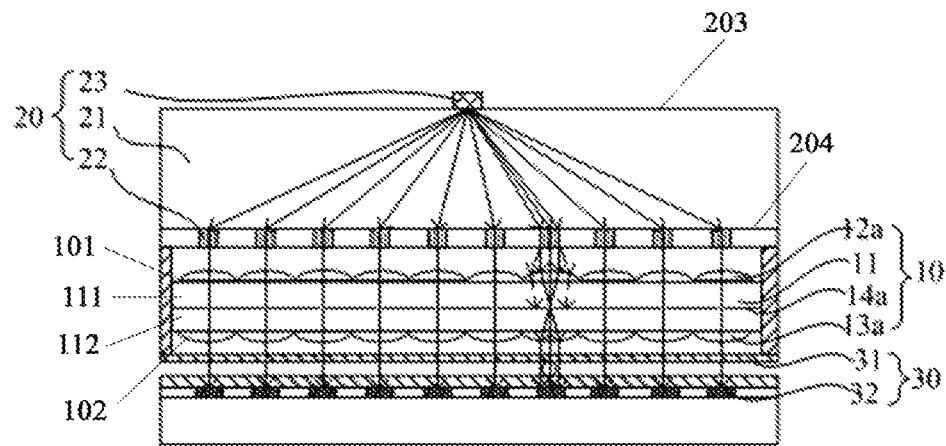
FIG. 1a is a schematic diagram illustrating a structure of a spectral detection system according to an embodiment of the present disclosure.

The present disclosure will be further described in detail below in conjunction with accompanying drawings and specific embodiments, for better understanding of the technical solutions according to the present disclosure by those skilled in that art.

As shown in FIG. 1a, FIG. 1b, FIG. 2, and FIG. 3, the present embodiment provides a light modulating device including a dispersion assembly 20 and a lens assembly 10.

The dispersion assembly 20 is disposed on a side of the lens assembly 10 proximal to a first lens component 12a and configured for dispersing the light emitted from a light source 23 into dispersed light and directing the dispersed light toward the lens assembly 10. The dispersed light at least includes collimated monochromatic light and non-collimated monochromatic light.

Specifically, the dispersion assembly 20 includes a second substrate 21, a light source 23, and a grating 22. The second substrate 21 has a third surface 203 and a fourth surface 204 disposed opposite to each other. The light source 23 is disposed on the third surface 203 of the second substrate.

The grating 22 is disposed on the fourth surface 204 of the second substrate. The grating 22 is configured to disperse the non-interfering light emitted from the light source 23 into different monochromatic lights to form the dispersed light, and direct the dispersed light toward the first lens component 12a. The grating 22 includes a plurality of sub-gratings 220. A second absorbing layer 221 is disposed at spaced position among the sub-gratings 220 and configured for absorbing light of non-designed angle that are not selected by the sub-grating 220.

Specifically, the second substrate 21 is made of transparent glass, such as ordinary glass or PMMA (polymethyl methacrylate). Since the glass is known as an inexpensive and common material, the light modulating device is inexpensive in manufacturing cost.

Optionally, the sub-grating 220 is in a form of raised lines that are imprinted on the fourth surface.

At the same time, a second absorbing layer 221 may be disposed at spaced positions among sub-gratings 220 and may be configured for absorbing light of non-designed angle emitted by the LED, to improve color separation accuracy. The second absorbing layer 221 is a black matrix layer disposed at spaced positions among sub-gratings. The sub-gratings 220 and the LED are respectively located on two sides of the second substrate, and the sub-gratings 220 are arranged at intervals to allow the LED light incident at certain incident angles to pass through the sub-gratings respectively, and the light incident at non-designed angles in the sub-grating interval region is absorbed by the second absorbing layer 221 to avoid subsequent interference.

The sub-gratings 220 in this embodiment is small in length, and the incident light from the corresponding light source 23 arrive at the interface of each sub-grating 220 is equivalent to a collimated light with a small angle (i.e., collimated light including collimated monochromatic light and non-collimated single light). To ensure high collimation, the light source 23 is required to be as small as possible in size, and the second substrate 21 is required to be as large as possible in thickness.

Figure 4:
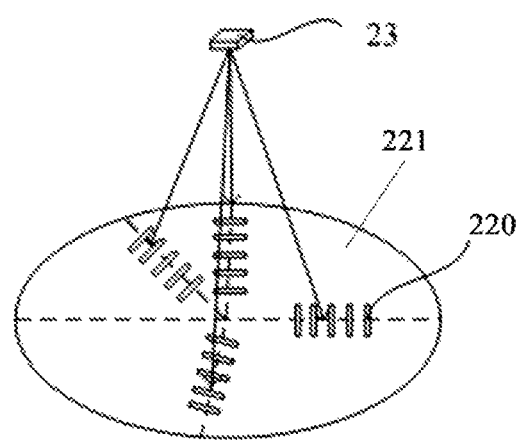
FIG. 4 is a schematic diagram illustrating a grating of a spectral detection system according to an embodiment of the present disclosure.

The rotation direction of grid lines of the sub-grating 220 is the same as the rotation of the light emitted from the light source 23, that is, a projection of the incident light on the fourth plane is perpendicular to the grid lines of the sub-grating 220, as shown in FIG. 4.

The lens assembly 10 configured for emitting monochromatic collimated light includes a first substrate 11, a first lens components 12a, 12b, a second lens components 13a, 13b, and a first absorbing layer 14a, 14b.

The first substrate 11 includes a first surface 101 and a second surface 102 disposed opposite to each other.

The first lens components 12a, 12b are located on the first surface 101 of the first substrate 11, and the second lens components 13a, 13b are located on the second surface 102 of the first substrate 11, i.e., the first lens components 12a, 12b and the second lens component 13a, 13b are disposed opposite to each other.

The first absorbing layer 14a, 14b are located at a focal plane of the first lens component between the first lens component 12a, 12b and the second lens component 13a, 13b and are configured for absorbing interference light having non-collimated angles to guarantee the collimation accuracy. The first absorbing layers 14a, 14b have openings, and the focal points of the first lens components 12a, 12b toward the first absorbing layers 14a, 14b coincide with focal points of the second lens components 13a, 13b toward the first absorbing layers 14a, 14b, and the openings are located at the coincident focal points of the first lens component 12a, 12b and the second lens components 13a, 13b.

In practical microfluidic detection applications, the first absorbing layer can be disposed outside the focal length of the second lens component, and finally an effect of converging each monochromatic light is obtained, so that energy is concentrated on a point of the detector, and the detection accuracy is improved.

The dispersed light may sequentially pass through the first lens components 12a, 12b, the first absorbing layers 14a, 14b, and the second lens components 13a, 13b. The first lens component, the first absorbing layer and the second lens component together form a frequency domain filtering system for filtering stray light having wavelengths which are not designed to be collimated, to realize a function of filtering and color separation with a high-precision. After being transmitted to the first lens components 12a, 12b, at least a portion of the dispersed light sheds on the second lens components 13a, 13b via the openings to emit collimated monochromatic light, that is, after being transmitted to the first lens components 12a, 12b, the first absorbing layers 14a, 14b absorbs a portion of the light emitted from the first lens components 12a, 12b, and the remaining light passes through the openings of the first absorbing layers 14a, 14b and then irradiates on the second lens components 13a, 13b, and finally collimated monochromatic light is emitted from the second lens component 13a, 13b.

The specific principle of the frequency domain filtering system according to the present application is as follows: the dispersed light passes through the first lens component for frequency conversion, and a collimated beam having any wavelength can be focused on the focus points of the first lens component, and the other non-collimated beams will deviate from the focus by a certain distance. After being subjected to a first Fourier frequency conversion, the collimated beam passes through the openings of the first absorbing layer, and the other non-collimated stray light beams are focused on positions outside the focus points after being subjected to the first Fourier frequency conversion, and are directly absorbed by the first absorbing layer. After the frequency-convened focused beam (the original collimated beam), which passed through the openings, passes through the second lens component, information in a frequency domain is restored to a spatial domain, that is, the frequency-converted beam is converted into the collimated beam again. Meanwhile, the collimated beams having the different wavelengths keep the relative positional relationship unchanged. Eventually, the collimated beams having multi-wavelengths are arranged in intervals without being interspersed with stray light, each collimated beam being a collimated monochromatic light.

The lens assembly 10 in the present embodiment is configured to filter the incident collimated light through the first absorbing layers 14a, 14b, so that the lens assembly 10 finally emits collimated monochromatic light.

Optionally, the first substrate 11 may be composed of two parts, a first sub-substrate 111 and a second sub-substrate 112; wherein a surface of the first sub-substrate 111 distal to the second sub-substrate 112 serves as a first surface 101 of the first substrate 11: a surface of the second sub-substrate 112 distal to the first sub-substrate 111 serves as a second surface 102 of the first substrate 11; that is, the first lens component 12a or 12b is disposed on the surface of the first sub-substrate 111 distal to the second sub-substrate; the second lens component 13a or 13b is disposed on the surface of the second sub-substrate 112 distal to the first sub-substrate; the first absorbing layer 14a or 14b is disposed between the first sub-substrate 111 and the second sub-substrate 112. In this way, the first absorbing layer 14a, 14h may be formed directly on the surface of the first sub-substrate 111 adjacent to the second sub-substrate, or on the surface of the second sub-substrate 112 adjacent to the first sub-substrate. Thus, the lens assembly 10 is simple to fabricate, and the first lens components 12a, 12b and the second lens components 13a, 13b can be guaranteed to keep their relative position more stable, thereby ensuring a performance of the lens assembly 10.

Optionally, the first substrate 11 is made of transparent glass, that is, each of the first sub-substrate III and the second sub-substrate 112 described above is made of transparent glass. The transparent glass may specifically be ordinary glass or PMMA. Since the glass is known as an inexpensive and common material, the lens assembly 10 is inexpensive in manufacturing cost.

If both the materials of the first lens component 12a or 12b and the second lens component 13a or 13b are made of glass, in some embodiments, the first lens component 12a or 12b and the first sub-substrate are constructed as an integrally formed structure, and the second lens component 13a or 13b and the second sub-substrate are constructed as an integrally formed structure. This structure is simple and the lens assembly 10 gets better performance.

When the first lens component 12a and the second lens component 12b include a plurality of lens respectively, and there are a plurality of openings, the plurality of openings respectively correspond to the sub-gratings 22; when the first lens component 12b and the second lens component 13b include one lens, respectively, and there is only one opening, the opening corresponds to the light source 23.

Specifically, as a first case in the embodiment, as shown in FIG. 1, the first lens component 12a in the lens assembly 10 in the present embodiment may include a plurality of lens, and at this time, the plurality of lens are arranged radially from middle to periphery; correspondingly, the second lens component 13a may include a plurality of lens where the plurality of lens are arranged radially from middle to periphery; at the same time, the first absorbing layer 14a in the lens assembly 10 has multiple openings. Moreover, the first lens component 12a, the second lens component 13a and the openings of the first absorbing layer 14a are arranged in one-to-one correspondence.

The following description is made based on the example of the light source illuminating white light and both the first lens component 12a and the second lens component 13a being Fourier lens. Obviously, the light emitted from the light source is not limited to white light, and the first lens component 12a and the second lens component 13a are not limited to the Fourier lens.

Figure 1B:
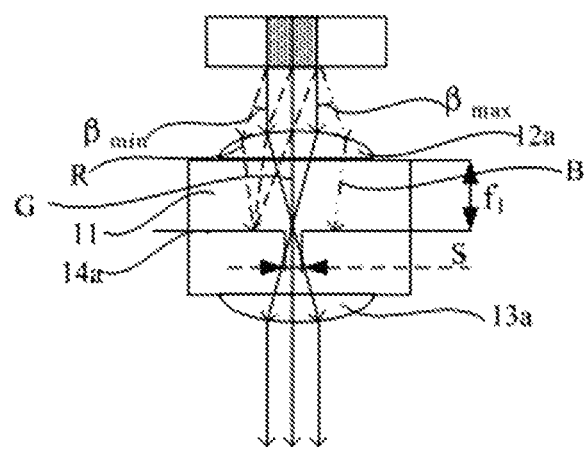
FIG. 1b is a partial enlarged diagram illustrating the structure of a spectral detection system according to an embodiment of the present disclosure.

As shown in FIG. 1b, the white light emitted from the light source irradiates on the sub-gratings 220, and the sub-gratings 220 disperse the white light into monochromatic light of red, green, and blue light. The light emitted from each of the sub-gratings 220 includes one type of collimated monochromatic light, that is, as shown in FIG. 1b, the collimated monochromatic light emitted from the sub-grating 220 is green light G, and non-collimated red light R and blue light B are dispersed on both sides of green light G respectively. The other sub-gratings may direct to collimate red light R, and non-collimated green light G and blue light B are dispersed on both sides of the red light R, respectively; or blue light B is directed to be collimated, and non-collimated green light G and red light R are dispersed on both sides of the blue light B lights, respectively. The following is described by taking a sub-grating as shown in FIG. 1b as an example.

When the first lens component 12a and the second lens component 13a are the first Fourier lens and the second Fourier lens respectively, the dispersed light passes through the first Fourier lens 12a for conversion from a spatial domain to a frequency domain, and the emitted light from the second Fourier lens 13a can convert the light from the frequency domain to the spatial domain.

Specifically, the two Fourier lenses and the first absorbing layer 14a form a frequency domain filtering system for filtering the non-collimated stray light, to achieve a function of filtering and color separation with high-precision. First, the light is subjected to frequency conversion through the first Fourier lens, and the collimated green light G may be focused on the focus point of the first Fourier lens, and the non-collimated red light R and the blue light B will deviate from the focus point by a certain distance. Second, the first absorbing layer 14a is located at a focal plane position of the first Fourier lens, and a light-transmissive opening is disposed at the focus point of the lens, and the collimated green light G passes through the first Fourier lens and then passes through the opening of the absorbing layer 14a, and the non-collimated red light R and the blue light B are focused on a position outside the focus point after being subjected to the first Fourier transform, and are directly absorbed by the first absorbing layer 14a. At last, the focused beam having passed through the opening and having been subjected to the frequency conversion (original collimated green light G) then passes through the second Fourier lens for conversion from the spatial domain to the frequency domain, to obtain the collimated green light G.

The different collimated monochromatic lights emitted from different sub-gratings keep their positions unchanged after passing through the second Fourier lens, and finally the collimated monochromatic light distributed in intervals will be obtained without the stray light. Thus, a collimated monochromatic beam having high accuracy is obtained.

Figure 2:
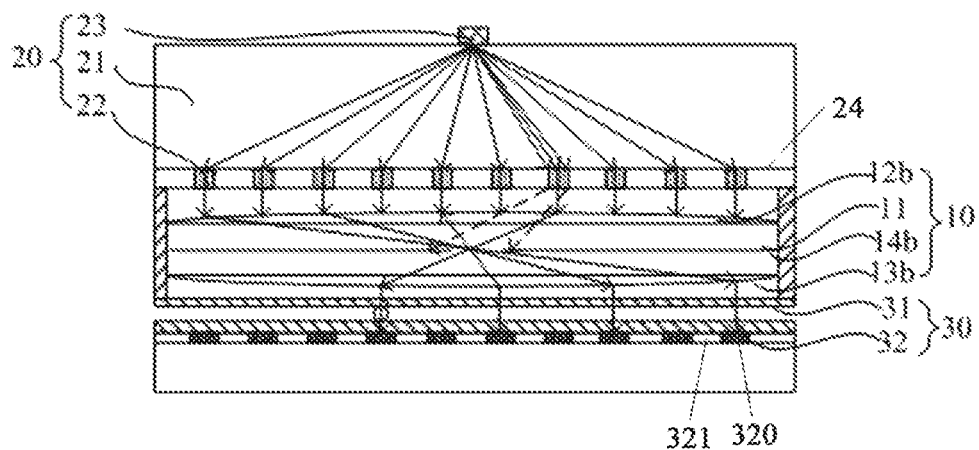
FIG. 2 is a schematic diagram illustrating the structure of another spectral detection system according to an embodiment of the present disclosure.
Figure 3:
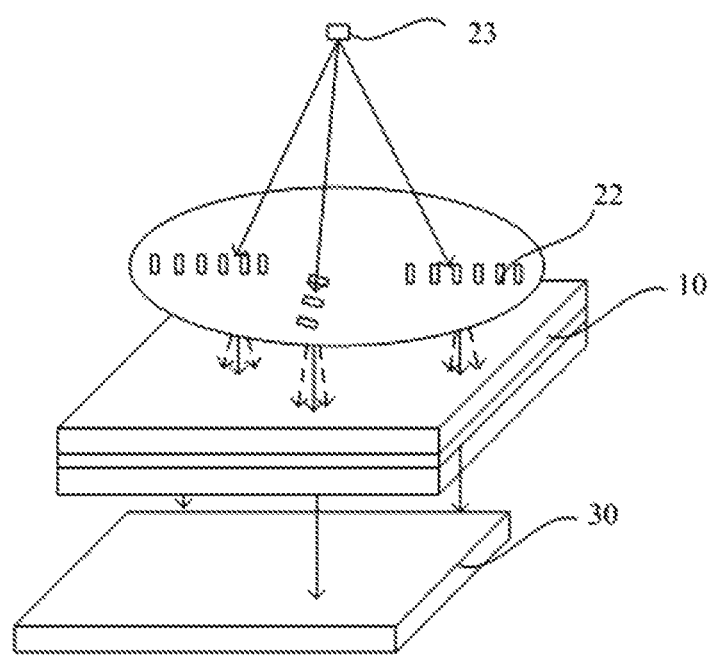
FIG. 3 is a stereogram illustrating a spectral detection system according to an embodiment of the present disclosure.

As shown in FIG. 2, as a second case in the present embodiment, the first lens component 12b and the second lens component 13b include one lens respectively; there is one opening in the first absorbing layer 14b. For the different collimated monochromatic light emitted from the different sub-gratings of the grating, positions where the different collimated monochromatic light is directed into the first Fourier lens are symmetrical with positions where the light is emitted from the second Fourier lens relative to the opening of the first absorbing layer 14b. The collimated different monochromatic light distributed in intervals is finally obtained without the stray light, thereby obtaining collimated monochromatic light beams with high accuracy. Specifically, the first lens component 12b focuses the collimated monochromatic light emitted from each sub-grating of the grating at the focus of the first lens component 12b, and then the collimated monochromatic light is emitted from the opening of the first absorbing layer 14b corresponding to the focus, and finally emitted from the second lens component 13b. The non-collimated stray light having passed through the first lens component 12b is directed toward non-opening positions of the first absorbing layer 14b, and is absorbed by the first absorbing layer 14b.

The sub-grating 220 in this embodiment conforms to the following grating equation:

$$n_1 \sin\theta_1 - n_2 \sin\theta_2 = \frac{m\lambda}{p}$$

wherein $n_1$ is a refractive index in the second substrate 21 of the incident light on the sub-gratings 220, $n_2$ is a refractive index in the first substrate 11 of the diffracted light on the sub-gratings 220, $\lambda$ is a wavelength of light to be collimated, and $\theta_1$ is an incident angle of the incident light on the grating interface, $\theta_2$ is a diffraction angle (in the present embodiment, $\theta_2$ is equal to zero), m is a diffraction level, and P is a period of the grating.

The period parameters of each sub-grating 220 can be determined according to the above grating equation. Each of the sub-gratings 220 of the grating 22 can efficiently collimate light of one color or one wavelength. A duty ratio of each sub-grating 220 is typically 0.5.

Specifically, as shown in FIG. 1b (different shapes of lines represent monochromatic lights having different colors in the drawing), shape of the opening of the first absorbing layer may be a rectangular or a circular. When the opening of the first absorbent layer is a rectangular, a formula for a side length of the opening of the first absorbent layer 14a is as follows:

$$S = d_{min} + d_{max},$$

$$d_{min} = |f_1 * \tan(\beta_{min})|, d_{max} = |f_1 * \tan(\beta_{max})|;$$

wherein $d_{min}$ is a distance from the position of the beam incident on the left side of the opening to the focus point, $d_{max}$ is a distance from the focus to the position of the beam incident on the right side, $f_1$ is a focal length of the first Fourier lens, and $\beta_{min}$ is a maximum exit angle of the dispersed light having a minimum wavelength within the spectral dispersion accuracy range on the left side of the sub-grating 220, $\beta_{max}$ is a maximum exit angle of the dispersed light having a maximum wavelength within the spectral dispersion accuracy range on the right side of the sub-grating 220.

As shown in FIG. 1a, FIG. 1b, FIG. 2 and FIG. 3, this embodiment provides a spectral detection system including the light modulating device and the detection device in the above embodiments. The spectral detection system can be applied to bacterial separation, spectroscopic detection, food detection, gene calibration and the like.

The detection device is configured to detect the collimated monochromatic light emitted by the light modulating device.

Specifically, the detection device includes a microfluidic device 31 and a detector array 32. The microfluidic device 31 is disposed on a side of the second lens components 13a, 13b of the lens assembly, and is configured for driving the microfluidic movement; the detector array 32 includes a plurality of detectors 320 disposed on a side of the microfluidic device 31 distal to the lens assembly, wherein light emitted from the lens assembly is directed through the microfluidic device 32 to the detector array 32. At the spaced positions of the detector array 32, a third absorbing layer 321 is also provided for absorbing stray light.

The microfluidics may be located in a channel of transport of the microfluidic device 31, the width and height of the channel may be in nanoscale, or any dimensions as required by an actual situation.

Further, the detector array 32 is disposed on a third substrate, and the third substrate may be made of glass, such as ordinary glass or PMMA. Since the glass is known as an inexpensive and common material, the spectrum detection system has a low manufacturing cost.

The detector unit can be a photosensitive detector for detecting the spectral response characteristics of the microfluidics. The detector type can be a CCD, a CMOS, a PIN, and the like.

The spectral detection system according to the present embodiment is divided into three parts, namely, a lens assembly 10, a dispersion assembly 20, and a detection device 30. The lens assembly 10 is disposed on the first substrate 11, and the dispersion assembly 20 is disposed on the second substrate 21. The spectral detection system is small in volume compared with spectral detection system in related art, resulting in a more flexible spectral detection system and a wide application scope.

In addition, the lens assembly 10, the dispersion assembly 20, and the detection device 30 utilize the glass substrate, respectively, so that the manufacturing cost of the spectral detection system is lowered.

It is to be understood that the above embodiments are merely exemplar embodiments employed to explain the principles of the disclosure, but the disclosure is not limited thereto. Various modifications and improvements can be made by those skilled in the art without departing from the spirit and scope of the disclosure. These modifications and improvements are also considered to be within the scope of the disclosure.

What is claimed is:

1. A light modulating device, comprising a dispersion assembly and a lens assembly,
   the dispersion assembly is configured to disperse light emitting from a light source into dispersed light which at least comprises collimated monochromatic light and non-collimated monochromatic light;
   the dispersion assembly comprises a light source and a grating, the grating is configured to disperse the light emitted from the light source into dispersed light;
   the lens assembly comprises:
   at least a first lens component;
   at least a second lens component disposed in a one-to-one correspondence with the first lens component; and
   a first absorbing layer disposed between the first lens component and the second lens component, the first absorbing layer has an opening, a focus point of the first lens component towards the first absorbing layer coincides with a focus point of the second lens component towards the first absorbing layer, the opening is disposed at the coincident focus point of the first lens component and the second lens component;
   wherein the opening has a size configured to allow the collimated monochromatic light transmitted from the first lens component to irradiate to the second lens component via the openings and emit out;
   wherein a shape of the opening of the first absorbing layer comprises a rectangle or a circle.

2. The light modulating device of claim 1, wherein the grating comprises a plurality of sub-gratings arranged in intervals, each sub-grating has a plurality of slits having a same length and a same spacing, light emitted from the light source has a projection on the grating plane being vertical to the slit of a sub-grating and passes through the sub-grating to obtain dispersed light, so that each sub-grating disperse a light having one wavelength into dispersed light, wherein a duty ratio of the sub-gratings is 0.5.

3. The light modulating device of claim 2, wherein the first lens component and the second lens component comprises one lens respectively; and
   the first absorbing layer has one opening.

4. The light modulating device of claim 2, wherein the first lens component and the second lens component comprise a plurality of lenses, respectively; and
   the first absorbing layer has a plurality of openings, and light emitted from each of the openings is monochromatic light.

5. The light modulating device of claim 2, wherein, a side length or a diameter S of the opening is:

$$S=|f_1*\tan(\beta_{min})|+|f_1*\tan(\beta_{max})|,$$

wherein, $f_1$ is a focus length of the first lens component, $\beta_{min}$ is a maximum exit angle of the dispersed light having a minimum wavelength within a spectral dispersion accuracy range on a side of the sub-gratings, and $\beta_{max}$ is a maximum exit angle of the dispersed light having a maximum wavelength within the spectral dispersion accuracy range on the other side of the sub-gratings.

6. The light modulating device of claim 5, wherein the sub-gratings have different orientations so that incident light having different wavelengths is dispersed into different dispersed light.

7. The light modulating device of claim 6, wherein the sub-gratings and the openings of the first absorbing layer are arranged in an array, respectively.

8. The light modulating device of claim 7, wherein the sub-gratings are arranged radially relative to a center of the grating.

9. The light modulating device of claim 8, wherein the lens assembly further comprises:
   a first substrate, the first substrate comprises a first surface and a second surface disposed opposite to each other, the first lens component is disposed on the first surface, and the second lens component is disposed on the second surface.

10. The light modulating device of claim 9, wherein the lens assembly further comprises:
    the first substrate comprises a first sub-substrate and a second sub-substrate, the first lens component is disposed on a surface of the first sub-substrate distal to the second sub-substrate, and the second lens component is disposed on a surface of the second sub-substrate distal to the first sub-substrate.

11. The light modulating device of claim 8, wherein the first substrate is made of transparent glass; and
    the first lens component and the second lens component are Fourier lenses, respectively.

12. The light modulating device of claim 11, wherein the dispersion assembly further comprises:
    a second substrate, the second substrate comprises a third surface and a fourth surface arranged opposite to each other, the light source is disposed on the third surface, and the grating is disposed on the fourth surface.

13. The light modulating device of claim 12, wherein a period of the sub-gratings is calculated according to the following grating equation:

$$n_1\sin\theta_1 - n_2\sin\theta_2 = \frac{m\lambda}{p}$$

wherein, $n_1$ is a refractive index in the second substrate of an incident light on the sub-grating, $n_2$ is a refractive index in the first substrate of the diffracted light on the sub-grating, $\lambda$ is a wavelength of the dispersed light dispersed by the sub-grating, $\theta_1$ is a incident angle, $\theta_2$ is a diffraction angle, m is a diffraction level, and P is a period of the sub-grating.

14. The light modulating device of claim 13, wherein the second substrate is made of transparent glass.

15. The light modulating device of claim 14, further comprises a second absorbing layer disposed in a spaced region among the sub-gratings of the grating, and configured to absorb light having incident angles which is different from designed angle.

16. The light modulating device of claim 15, wherein the first absorbing layer and the second absorbing layer are black matrix layer, respectively.

17. A spectral detection system, comprising:
the light modulating device of claim 1; and
a detection device, comprising:
a microfluidic device disposed on a side of the lens assembly proximal to the second lens, and configured to drive microfluidic movement; and
a detector array disposed on a side of the microfluidic device distal to the lens assembly, wherein the light emitted from the lens assembly passes the microfluidic device and irradiates the detector array.

18. The spectral detection system of claim 17, further comprising: a third substrate and a third absorbing layer, the detector array is disposed on the third substrate, the third absorbing layer is a black matrix layer disposed in a spaced region among the detector array and configured to absorb stray light, the third substrate is made of glass.

19. The spectral detection system of claim 18, wherein the detector array comprises light-sensitive detectors.

* * * * *